United States Patent
Hu et al.

(10) Patent No.: US 10,936,385 B2
(45) Date of Patent: Mar. 2, 2021

(54) RUNNING KERNEL DEPENDENT APPLICATIONS INSIDE A CONTAINER

(71) Applicant: INTERNATIONAL BUSINESS MACHINES CORPORATION, Armonk, NY (US)

(72) Inventors: Yanyan Hu, Beijing (CN); Guang Cheng Li, Beijing (CN); Yubo Li, Beijing (CN); Chao Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 15/587,614

(22) Filed: May 5, 2017

(65) Prior Publication Data
US 2018/0321960 A1  Nov. 8, 2018

(51) Int. Cl.
*G06F 9/54* (2006.01)
*G06F 9/455* (2018.01)
*G06F 9/48* (2006.01)

(52) U.S. Cl.
CPC .......... *G06F 9/545* (2013.01); *G06F 9/45558* (2013.01); *G06F 9/4843* (2013.01)

(58) Field of Classification Search
None
See application file for complete search history.

(56) References Cited

U.S. PATENT DOCUMENTS

| 8,266,616 | B1 | 9/2012 | Jacquot et al. |
| 8,484,728 | B2 | 7/2013 | De Atley et al. |
| 9,223,966 | B1* | 12/2015 | Satish ............... G06F 21/53 |
| 9,276,816 | B1 | 3/2016 | Conte et al. |
| 9,367,244 | B2 | 6/2016 | Kulkarni |
| 9,367,305 | B1 | 6/2016 | Kumar et al. |
| 9,811,363 | B1* | 11/2017 | Wagner ............... G06F 9/44521 |
| 2014/0282433 | A1* | 9/2014 | Eilam ................. G06F 11/3676 717/131 |
| 2016/0359955 | A1* | 12/2016 | Gill ....................... H04L 67/10 |
| 2017/0180249 | A1* | 6/2017 | Shen ..................... H04L 45/586 |

FOREIGN PATENT DOCUMENTS

| CN | 105204913 A | 12/2015 |
| WO | 2016115371 A1 | 7/2016 |

OTHER PUBLICATIONS

Aspernäs et al., "Container Hosts as Virtual Machines—A Performance Study," Bachelor Thesis Project, 2016, p. 1-37, Linnaeus University.
(Continued)

*Primary Examiner* — Lewis A Bullock, Jr.
*Assistant Examiner* — Melissa A Headly
(74) *Attorney, Agent, or Firm* — Alexis N. Hatzis

(57) ABSTRACT

A method, computer program product, and computer system are provided for running an application over a host kernel. The method intercepts a system call initiated by a container instance running on a host kernel, then determines whether the initiating container instance is tagged with a mapping to a virtual machine (VM) also running on the host kernel. The method further redirects the system call to the mapped VM responsive to the initiating container instance being tagged with a mapping to a VM, wherein the system call is to be processed by the VM.

18 Claims, 4 Drawing Sheets

(56) References Cited

OTHER PUBLICATIONS

Hu et al., "Running a Kernel-Dependent Application in a Container," Application and Drawings, Filed on Feb. 23, 2017, 30 Pages, U.S. Appl. No. 15/440,477.
Jain et al., "Hardware Assisted OS Virtualization," 25th ACM Symposium on Operating Systems Principles (SOSP), 2015, 1 Page, Extended Abstract.
Mell et al., "The NIST Definition of Cloud Computing," National Institute of Standards and Technology, Sep. 2011, p. 1-3, Special Publication 800-145.

* cited by examiner

RUNNING KERNEL DEPENDENT APPLICATIONS INSIDE A CONTAINER

BACKGROUND

The present application relates generally to improved data processing, and more specifically to running kernel dependent applications inside a container.

Container based virtualization and application containerization are operating system (OS) level virtualizations for deploying and running distributed applications without launching an entire virtual machine (VM) for each application. Instead, multiple isolated systems, called containers, are run on a single control host and access a single kernel. Because containers share the same OS kernel as the host, containers can be more efficient than VMs, which require separate OS instances. Because a container itself does not have a dedicated OS, a kernel dependent application cannot be run inside a container.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for running an application over a host kernel. The illustrative embodiment depicts the interception of a system call initiated by a container instance running on a host kernel. The illustrative embodiment includes determining whether the initiating container instance is tagged with a mapping to a VM also running on the host kernel. The illustrative embodiment further includes redirecting the system call to the mapped VM responsive to the initiating container instance being tagged with a mapping to a VM, wherein the system call is to be processed by the VM.

In other illustrative embodiments, a computer program product comprising a computer useable or readable medium having a computer readable program is provided. The computer readable program, when executed on a computing device, causes the computing device to perform variations of, and combinations of, the operations outlined above regarding the method for running an application over a host kernel.

In yet another illustrative embodiment, a computer system is provided. The computer system may be comprised of one or more processors and a memory coupled to the one or more processors. The memory may be comprised of instructions which, when executed by the one or more processors, cause the one or more processors to perform variations of, and combinations of, the operations outlined above with regard to the method for running an application over a host kernel.

These and other features and advantages of the present invention will be described in, and will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood with reference to the following detailed description of illustrative embodiments when read in conjunction with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
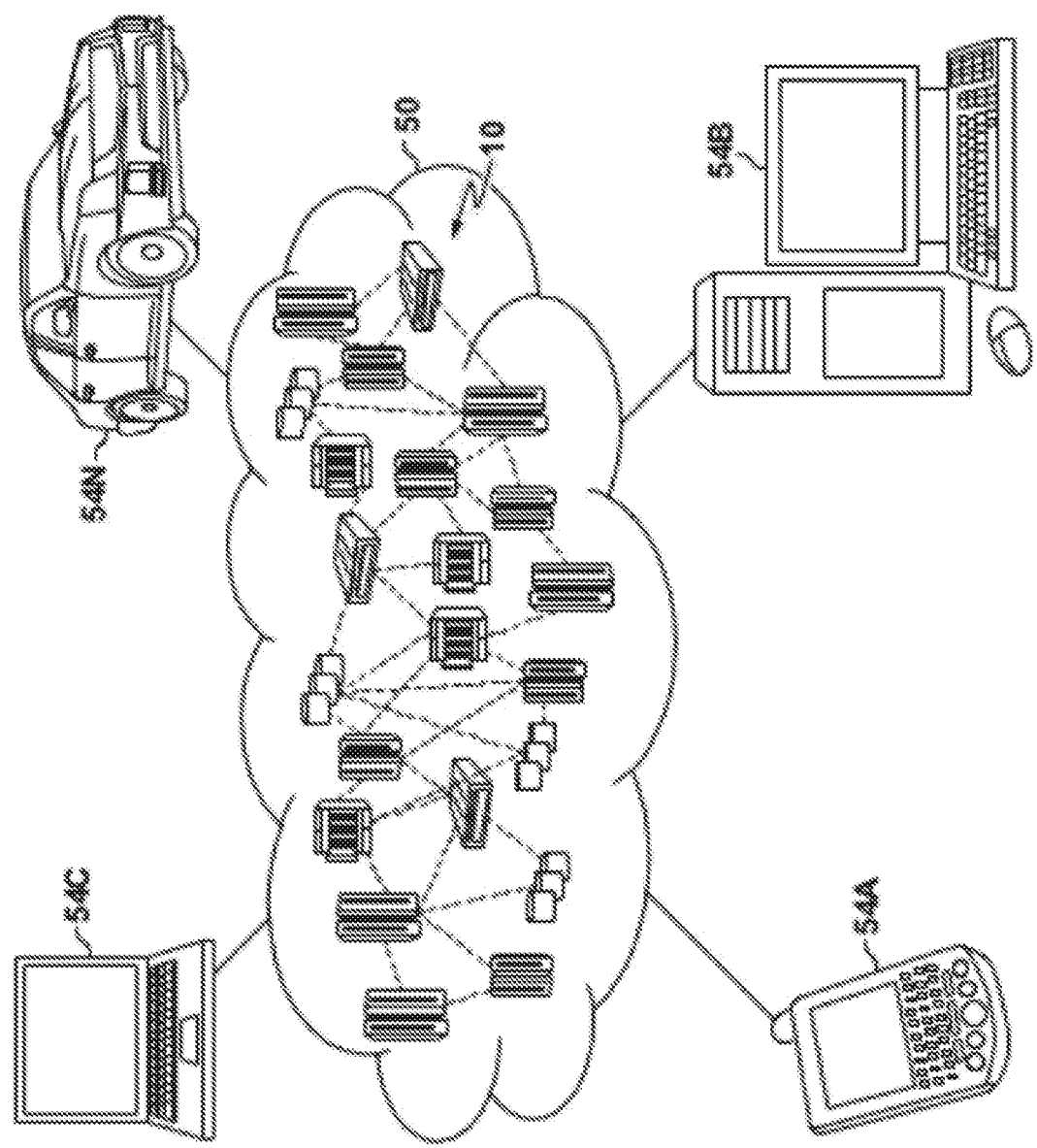
FIG. 1 depicts a cloud computing environment according to an embodiment of the present invention.

Some preferable embodiments will be described in more detail with references to the accompanying drawings, in which the preferable embodiments of the present disclosure have been illustrated. However, the present disclosure can be implemented in various manners, and thus should not be construed to be limited to the embodiments disclosed herein.

As mentioned in the background, because a container itself does not have a dedicated OS, a kernel dependent application cannot be run inside a container. Here, a kernel dependent application refers to an application that will need to modify the host kernel of the container, or requires a different kernel other than the host kernel of the container.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
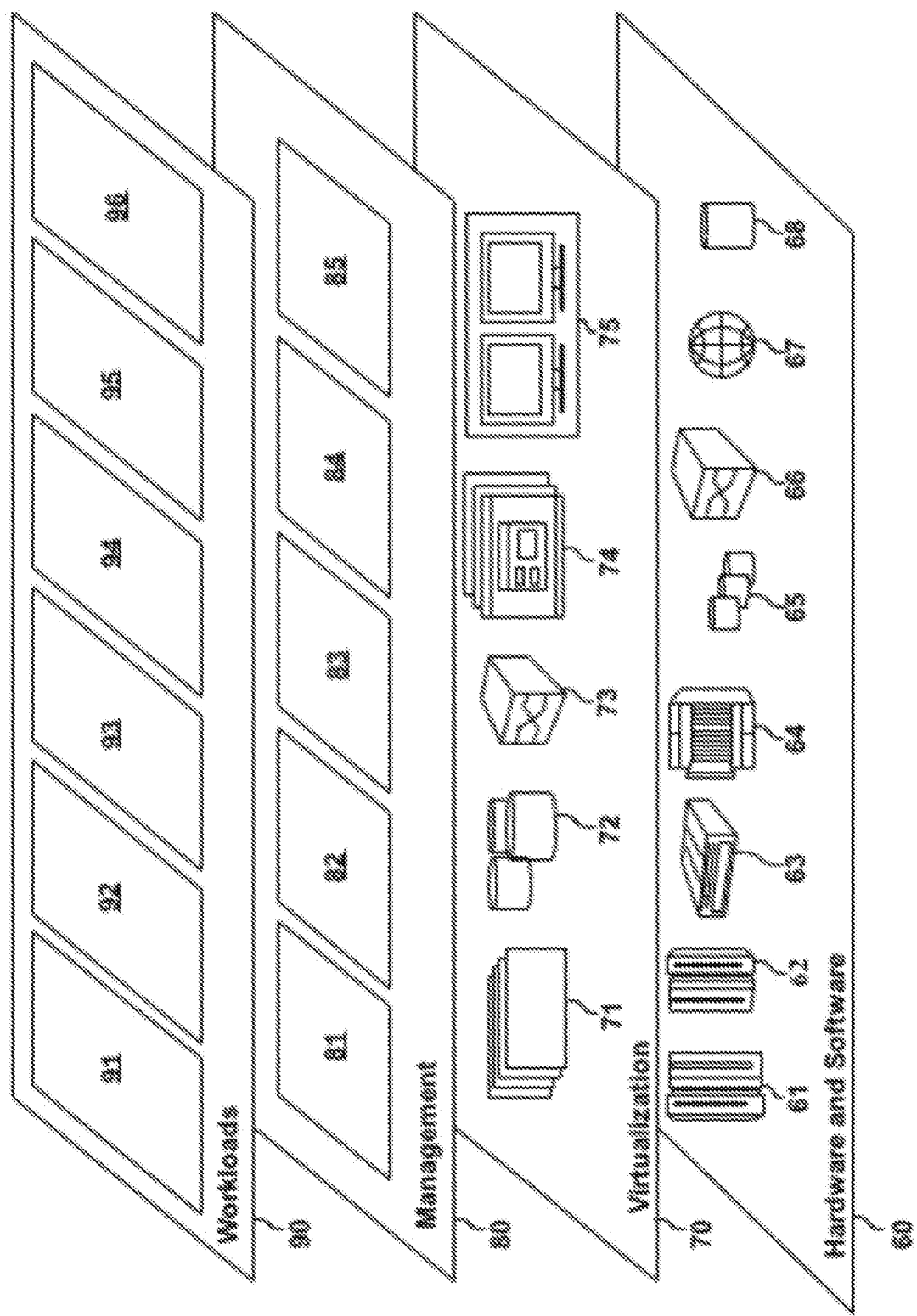
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and running kernel dependent applications inside a container 96.

As aforementioned, a kernel dependent application cannot be run inside a container as it will need to modify the host kernel, or requires a different kernel other than the host kernel, which typically is not the case in the containerization scenario in which all container instances share the same host kernel that cannot be modified by applications. Targeting this problem, it is provided in the present disclosure, embodiments of running kernel dependent applications inside a container, which will be discussed in detail in the following.

Figure 3:
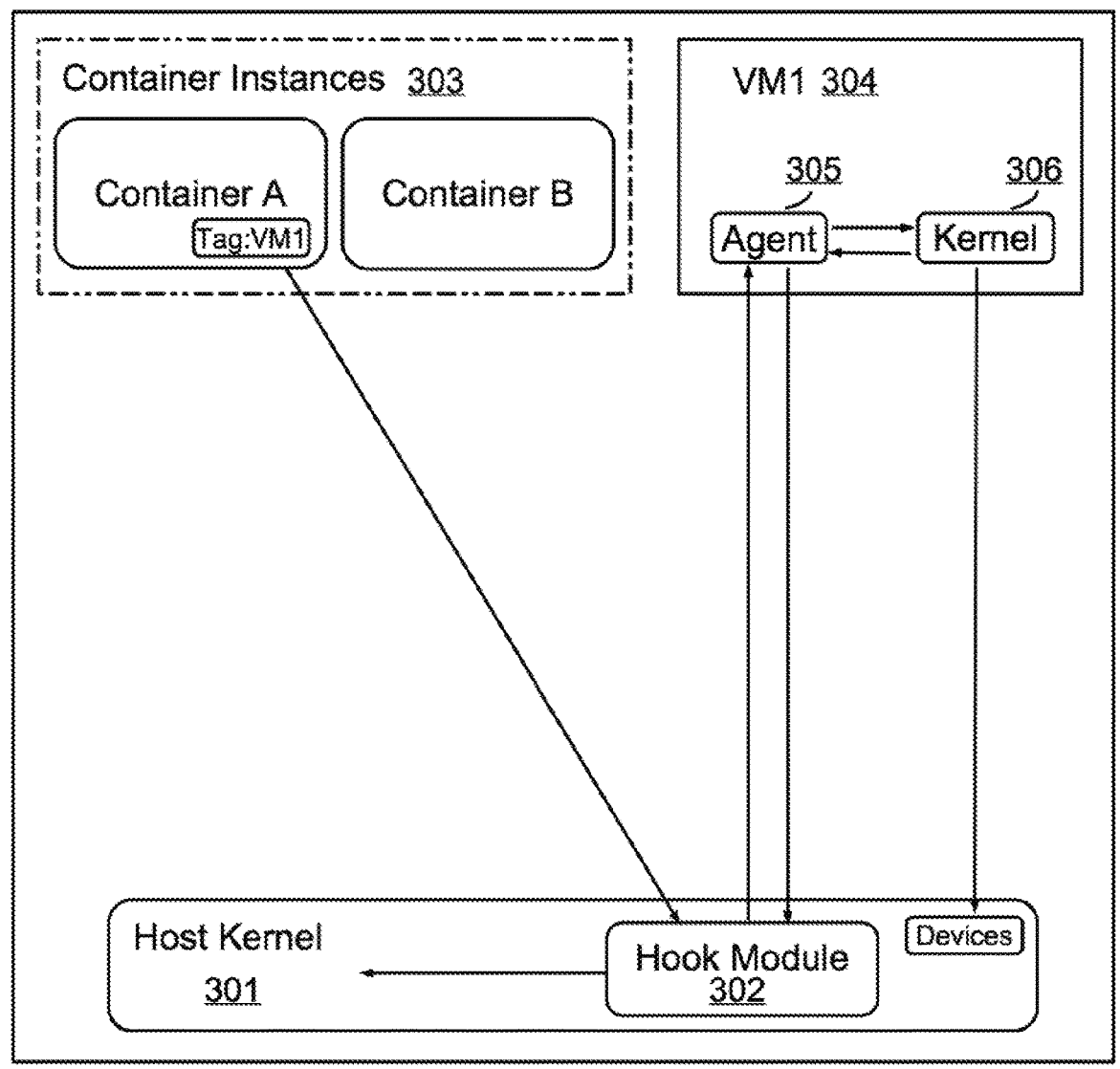
FIG. 3 illustrates an exemplary illustration of a kernel dependent application running inside a host container according to an embodiment of the present invention.

Now referring to FIG. 3, in which a block diagram of an exemplary system 300 according to an embodiment of the present invention is shown. In the system 300 of FIG. 3, container instances 303 (Container A and Container B) are run upon a host kernel 301. According to an embodiment of the present invention, at least one application run inside its container is kernel dependent, shown in FIG. 3 as Container A (the application itself is not shown). Other than container instances, a virtual machine VM1 304 is also run upon the host kernel 301. Inside the virtual machine VM1 304, kernel 306 of guest operating system is installed. According to an embodiment of the present invention, kernel 306 is the kernel required by the kernel dependent application run inside Container A. Also, as kernel 306 is running inside a virtual machine upon the host kernel 301, it could be modified.

As it is well known, a system call is how an application requests a service from an operating system kernel that it does not normally have permission, which may include hardware-related services (for example, accessing a hard disk drive), creation and execution of new processes, and communication with integral kernel services such as process scheduling. According to an embodiment of the invention, Container A is further tagged with a mapping to VM1 304, shown in FIG. 3 as "Tag:VM1", so that system calls initiated by it could be redirected to VM1 304 for processing.

In order to redirect system calls initiated by Container A to VM1 304, a hook module 302 is further provided in the host kernel 301 to intercept all system calls initiated by all container instances. With reference again to FIG. 3, suppose a system call is received by the host kernel 301 from one of its container instances 303, the system call will be intercepted by the hook module 302. The hook module 302 then determines its initiating container and further checks whether its initiating container instance is tagged with a mapping to a virtual machine. For example, if the initiating container instance of the system call is Container A, the hook module 302 will determine that it is tagged with a mapping to VM1 304. If the initiating container instance of the system call is Container B, the hook module 302 will determine that it is not tagged with any mapping to any virtual machine, as shown in FIG. 3. The hook module 302 further redirects the system call to the mapped VM1 304 for processing responsive to the determination that the initiating container instance is tagged with a mapping to VM1 304, or pass the system call to the host kernel 301 for processing responsive to the determination that the initiating container instance is not tagged with any mapping to any virtual machine.

According to an embodiment of the present invention, it is provided in the virtual machine VM1 304 an agent 305 to handle the redirected system call from the hook module 302 of the host kernel 301. Upon receiving the redirected system call, the agent 305 passes it to the kernel 306 of the VM1 304 for processing. Then the agent 305 further receives from the kernel 306 and sends back to the hook module 302 the result of the system call after it has been processed by the kernel 306 of the VM1 304.

According to an embodiment of the present invention, if the redirected system call requires access to a device of the host kernel 301, the kernel 306 of the VM1 304 will access the device of the host kernel 301 directly. This could be done by passing through the device from the host kernel 301 to the kernel 306 of the VM1 304. Device passthrough is a function in virtualization, with the device passthrough function, the kernel 306 of the virtual machine VM1 304 could directly access devices on the host kernel 301.

It is described in detail in the above embodiments of the present invention that it is possible to run kernel dependent applications inside a container. A container instance with a kernel dependent application running inside it is tagged with a mapping to a virtual machine with the kernel that the application requires installed so that the virtual machine can handle system calls of the application. It should be noted that although only two containers are shown in FIG. 3 for the purpose of simplified illustration, more container instances could be run upon the host kernel 301. Also, only one virtual machine is shown in FIG. 3 for the purpose of simplified illustration, more virtual machine could be run upon the host kernel 301. According to an embodiment of the present invention, a plurality of virtual machines, a plurality of kernel dependent applications and a plurality of kernel independent applications run inside their container instances respectively could be run upon the host kernel 301. Some kernel dependent applications could share one single virtual machine, while others could have their own dedicated virtual machine. In order for some of the plurality of kernel dependent applications to share one single virtual machine, the following criteria should be met: 1) all the kernel dependent applications that share the single virtual machine require the same kernel (other than the host kernel 301); 2) all the kernel dependent applications that share the single virtual machine access specific device(s) using the same driver(s) if needed. According to another embodiment of the present invention, a single virtual machine, a plurality of kernel dependent applications and a plurality of kernel independent applications run inside their container instances respectively could be run upon the host kernel 301. In order for all of the plurality of kernel dependent applications to share one virtual machine, the following criteria must be met: 1) all the kernel dependent applications need the same kernel (other than the host kernel 301), 2) all the kernel dependent applications access the specific device(s) using the same driver(s) if needed. With all the plurality of kernel dependent applications sharing the single virtual machine, the overhead introduced by running virtual machines on the host kernel 301 of the container instances will be reduced.

Figure 4:
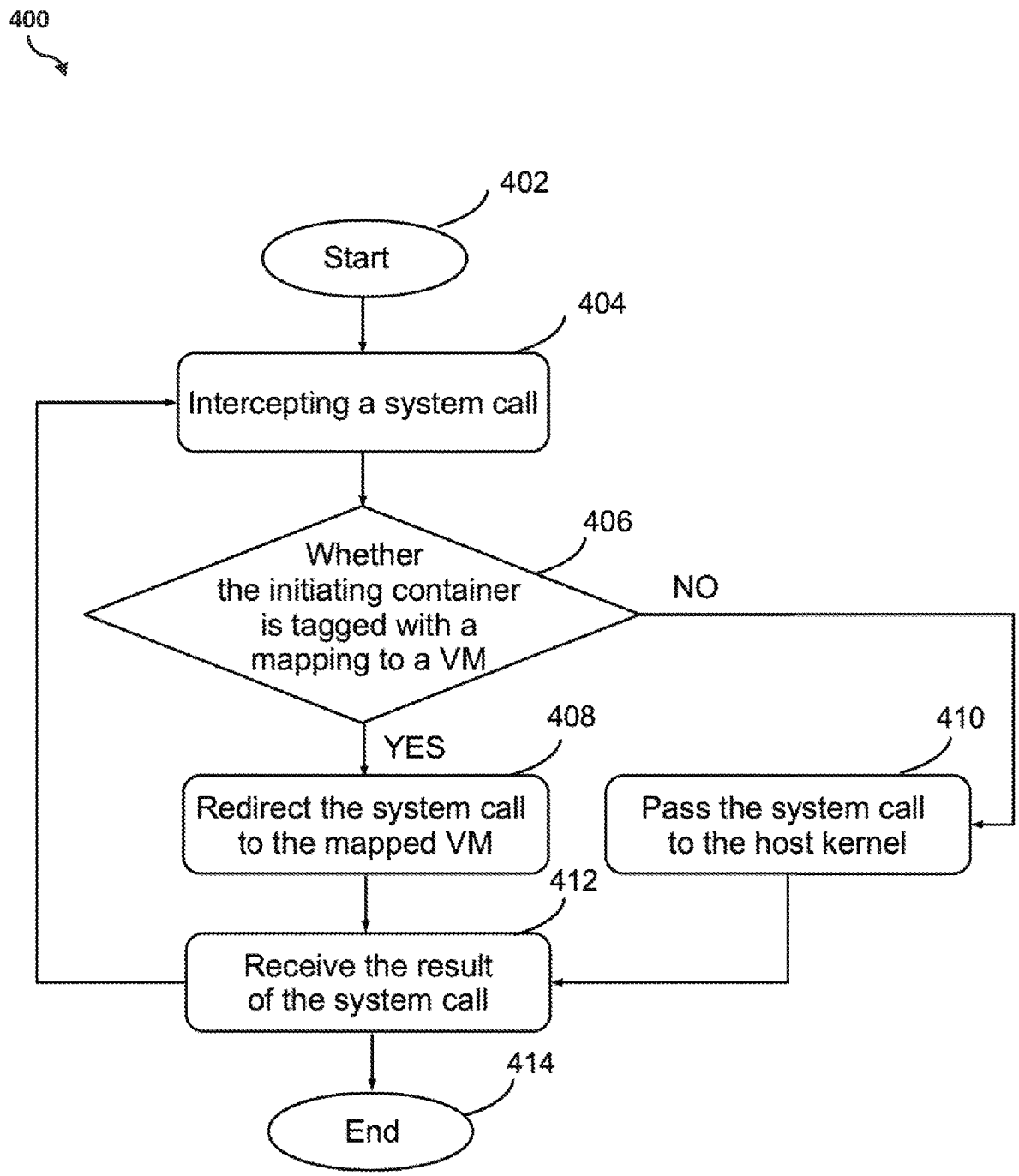
FIG. 4 illustrates an operational flowchart of an exemplary method for running an application over a host kernel according to an embodiment of the present invention.

Now referring to FIG. 4, in which a flowchart of an exemplary method 400 according to an embodiment of the present invention is shown. The exemplary method 400 starts from Step 402. Next, in Step 404, a system call is intercepted, for example, by the hook module 302 in the FIG. 3 described above. The system call is initiated by one of a plurality of container instances running on the host kernel 301 to require a service from the host kernel 301. Such services include but are not limited to hardware-related services (for example, accessing a hard disk drive), creation and execution of new processes, and communication with integral kernel services such as process scheduling etc. Next, in Step 406, whether the initiating container instance of the system call is tagged with a mapping to a virtual machine is determined also by, for example, the hook module 302 in the FIG. 3. First, the identifier of the initiating container instance could be determined based on the system call. Then, based on the identifier, it is further determined whether the identifier is tagged with a mapping to a virtual machine. Responsive to the determination that the initiating container instance being tagged with a mapping to a virtual machine, the system call is redirected to the mapped virtual machine for processing, as shown in Step 408. Responsive to the determination that the initiating container instance not being tagged with a mapping to a virtual machine, the system call is passed to the host kernel 301 of the container for processing, as shown in Step 410. Then, in Step 412, the result of the system call is received either from the virtual machine that processes the system call in the case that the initiating container instance is tagged with a mapping to the virtual machine, or from the host kernel 301 in the case that the system call is not tagged with any mapping to any virtual machine. The exemplary method 400 may end at Step 414.

According to an embodiment of the present invention, the redirected system call is received and passed to the kernel of the mapped virtual machine for processing by an agent deployed upon the kernel of the virtual machine. Also, the result of the redirected system call is received from the kernel of the mapped virtual machine and sent back to the host kernel 301 by the agent. If the redirected system call requires access to a device of the host kernel 301, the kernel of the mapped virtual machine will access the device of the host kernel 301 directly by passing through the device from the host kernel 301 to the kernel of the mapped virtual machine.

According to an embodiment of the present invention, a plurality of virtual machines, a plurality of kernel dependent applications and a plurality of kernel independent applications run inside their container instances respectively could be run upon the host kernel 301. Some of the plurality of kernel dependent applications could share one single virtual machine, while other could have their own dedicated virtual machine respectively. In order for some of the plurality of kernel dependent applications to share one single virtual machine, the following criteria should be met: 1) all the kernel dependent applications that share the single virtual machine require the same kernel (other than the host kernel 301); 2) all the kernel dependent applications that share the single virtual machine access specific device(s) using the same driver(s) if needed. According to another embodiment of the present invention, a single virtual machine, a plurality of kernel dependent applications and a plurality of kernel independent applications run inside their container instances respectively could be run upon the host kernel 301. In order that all the plurality of kernel dependent applications could share one virtual machine, the following criteria must be met: 1) all the kernel dependent applications need the same kernel (other than the host kernel 301), 2) all the kernel dependent applications access the specific device(s) using the same driver(s) if needed. With all the plurality of kernel dependent applications sharing the single virtual machine, the overhead introduced by running virtual machines on the host kernel 301 of the container instances will be reduced.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for running a plurality of applications over a host kernel, the method comprising:

determining whether a plurality of container instances are running kernel dependent applications;

based on the determining, tagging one or more container instances of the plurality of container instances that are running kernel dependent applications with a mapping to a virtual machine (VM) running on the host kernel, wherein the tagging enables the redirection of system calls from a mapped container instance to the mapped VM and prevents the system calls from being passed directly to the host kernel for processing;

detecting, by a hook module, a system call from at least one of the plurality of container instances running on the host kernel;

intercepting, by the hook module, the system call;

determining, by the hook module, an identifier of at least one initiating container instance based on the system call, wherein the at least one initiating container instance is at least one of the plurality of container instances running on the host kernel;

determining, by the hook module, and based on the determined identifier, whether the initiating container instance is tagged with the mapping to the mapped VM also running on the host kernel, which tagging redirects the system call to the mapped VM; and responsive to the initiating container instance being tagged with the mapping to the mapped VM:

redirecting, by the hook module, the system call to the mapped VM;

receiving the redirected system call, by an agent running on a kernel of the mapped VM;

passing, by the agent, the received redirected system call from the host kernel to the kernel of the mapped VM for processing by the agent, wherein processing by the agent includes accessing a device of the host kernel by passing through the device of the host kernel to the kernel of the mapped VM; and receiving a result of the redirected system call from the agent.

2. The method of claim 1, further comprising: receiving, by the hook module, a result of the system call processed by the VM.

3. The method of claim 1, wherein devices of the host kernel are passed through from the host kernel to the VM.

4. The method of claim 3, wherein the devices are further accessed by the kernel of the VM to process the system call responsive to the system call requesting to access the devices.

5. The method of claim 1, further comprising:

responsive to the initiating container instance not being tagged with a mapping to a VM, passing, by the hook module, the system call to the host kernel, wherein the system call is to be processed by the host kernel.

6. The method of claim 1, wherein there are a plurality of container instances and a single VM shared by the plurality of container instances running on the host kernel.

7. The method of claim 1, wherein there are a plurality of container instances and a plurality of VMs running on the host kernel.

8. A computer program product comprising a computer readable storage medium having a computer readable program stored therein, wherein the computer readable program, when executed on a computing device, causes the computing device to:

determine whether a plurality of container instances are running kernel dependent applications;

based on the determining, tag one or more container instances of the plurality of container instances that are running kernel dependent applications with a mapping to a virtual machine (VM) running on the host kernel, wherein the tagging enables the redirection of a system calls from a mapped container instance to the mapped VM and prevents the system call from being passed directly to the host kernel for processing;

detect a system call from at least one of the plurality of container instances running on the host kernel;

intercept the system call;

determine an identifier of the at least one initiating container instance based on the system call, wherein the at least one initiating container instance is at least one of the plurality of container instances running on the host kernel;

determine, based on the determined identifier, whether the initiating container instance is tagged with the mapping to the mapped VM also running on the host kernel which tagging redirects the system call to the mapped VM; and responsive to the initiating container instance being tagged with the mapping to the mapped VM:

redirect the system call to the mapped VM, receive the redirected system call, by an agent running on a kernel of the mapped VM;

pass, by the agent, the received redirected system call from the host kernel to the kernel of the mapped VM for processing by the agent, wherein processing by the agent includes accessing a device of the host kernel by passing through the device of the host kernel to the kernel of the mapped VM; and receiving a result of the redirected system call from the agent.

9. The computer program product of claim 8, wherein the computer readable program further causes the computing device to receive a result of the system call processed by the VM.

10. The computer program product of claim 8, wherein the devices of the host kernel are passed through from the host kernel to the VM.

11. The computer program product of claim 10, wherein the devices are further accessed by the kernel of the VM to process the system call requesting to access the devices.

12. The computer program product of claim 8, wherein the computer readable program further causes the computing device to:

responsive to the initiating container instance not being tagged with a mapping to a VM, passing the system call to the host kernel, wherein the system call is to be processed by the host kernel.

13. A computer system, comprising a processor, and a memory coupled to the processor, wherein the memory comprises instructions which, when executed by the processor, cause the processor to perform a method comprising:

determining whether a plurality of container instances are running kernel dependent applications;

based on the determining, tagging one or more container instances of the plurality of container instances that are running kernel dependent applications with a mapping to a virtual machine (VM) running on the host kernel, wherein the tagging enables the redirection of a system calls from a mapped container instance to the mapped VM and prevents the system call from being passed directly to the host kernel for processing;

detecting, by a hook module, a system call from at least one of the plurality of container instances running on the host kernel;

intercepting, by the hook module, the system call;

determining, by the hook module, an identifier of the at least one initiating container instance based on the system call, wherein the at least one initiating container instance is at least one of the plurality of container instances running on the host kernel;

determining, by the hook module, and based on the determined identifier, whether the initiating container instance is tagged with the mapping to the mapped VM also running on the host kernel, which tagging redirects the system call to the mapped VM; and responsive to the initiating container instance being tagged with the mapping to the mapped VM:

redirecting, by the hook module, the system call to the mapped VM;

receiving the redirected system call, by an agent running on a kernel of the mapped VM;

passing, by the agent, the received redirected system call from the host kernel to the kernel of the mapped VM for processing by the agent, wherein processing by the agent includes accessing a device of the host kernel by passing through the device of the host kernel to the kernel of the mapped VM; and receiving a result of the redirected system call from the agent.

14. The computer system of claim 13, further comprising: receiving a result of the system call processed by the VM.

15. The computer system of claim 13, wherein the system call is further received and passed to the kernel of the VM for processing by an agent running on the kernel of the VM.

16. The computer system of claim 13, wherein the devices of the host kernel are passed through from the host kernel to the VM.

17. The computer system of claim 16, wherein the devices are further accessed by the kernel of the VM to process the system call.

18. The computer system of claim 13, further comprising:
responsive to the initiating container instance not being tagged with a mapping to a VM, passing the system call to the host kernel, wherein the system call is to be processed by the host kernel.

* * * * *